(12) United States Patent
Weaver

(10) Patent No.: US 6,873,618 B1
(45) Date of Patent: Mar. 29, 2005

(54) MULTIPOINT NETWORK ROUTING PROTOCOL

(75) Inventor: Jeffrey Charles Weaver, Ottawa (CA)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/270,930

(22) Filed: Mar. 16, 1999

(51) Int. Cl.$^7$ .............................. H04L 12/56; H04J 3/26
(52) U.S. Cl. ...................... 370/390; 370/432; 370/389
(58) Field of Search ................................ 370/390, 432, 370/389, 392, 394, 401, 428, 229, 230, 475, 437

(56) References Cited

U.S. PATENT DOCUMENTS

| | | | | |
|---|---|---|---|---|
| 5,056,085 A | * | 10/1991 | Vu | 370/400 |
| 5,128,789 A | * | 7/1992 | Abramovitz | 359/118 |
| 6,272,135 B1 | * | 8/2001 | Nakatsugawa | 370/390 |
| 6,356,553 B1 | * | 3/2002 | Nagami et al. | 370/397 |
| 6,370,142 B1 | * | 4/2002 | Pitcher et al. | 370/390 |
| 6,430,621 B1 | * | 8/2002 | Srikanth et al. | 709/238 |
| 6,434,622 B1 | * | 8/2002 | Monteiro et al. | 709/231 |
| 6,526,056 B1 | * | 2/2003 | Rekhter et al. | 370/392 |
| 6,570,875 B1 | * | 5/2003 | Hegde | 370/389 |

OTHER PUBLICATIONS

Fenner, W., "Internet Group Management Protocol, Version 2," Request for Comments: 2236, Nov. 1997, 22 pages.
Cain et al., "Internet Group Management Protocol, Version 3," Internet Draft, Mar. 2000, 40 pages.

* cited by examiner

*Primary Examiner*—Chi Pham
*Assistant Examiner*—Ronald Abelson
(74) *Attorney, Agent, or Firm*—Blakely Sokoloff Taylor & Zafman (57) ABSTRACT

A method and apparatus for forwarding multicast data packets in a meshed topology network. A packet forwarding device receives a multicast data packet at an ingress port of the packet forwarding device, determines if the multicast data packet has been previously received, and if so, discards the multicast data packet. Otherwise, the packet forwarding device determines the appropriate ports of the packet forwarding device out which the multicast data packet is to be forwarded according to a packet forwarding control protocol and forwards the multicast data packet out the appropriate ports.

53 Claims, 2 Drawing Sheets

MULTIPOINT NETWORK ROUTING PROTOCOL

BACKGROUND OF THE INVENTION

1. Field of the Invention

The present invention is related to data communications. In particular, the present invention is related to a method and apparatus for multicasting data packets in a meshed topology network.

2. Description of the Related Art

Simultaneously, or nearly simultaneously, sending a data packet from a source node to multiple destination nodes may be accomplished by multicasting. Multicasting provides point to multipoint delivery of a data packet to nodes that statically or dynamically choose to receive the data packet Generally, multicasting utilizes a special destination hardware address recognized by a group of destination nodes. In a meshed topology network, a source node is likely connected to a destination node via multiple paths, each defined by a unique combination of switches, or routers, and point to point connections. The switches/routers implement software, firmware, or the like, that stores and forwards multicast data packets. Thus, multicasting generally results in a destination node that chooses to be a member of the multicast group receiving multiple copies of a multicast data packet sent to the multicast group, one for each unique path between the source node and the destination node in the network.

Today, as the size of internetworks grows, and as the amount of point-to-multipoint, or multipoint-to-multipoint communications across internetworks grows, the management of multicast data traffic is an increasingly important issue. In the case of bridged local area networks, the Institute of Electrical and Electronic Engineers (IEEE) standardized on a distributed algorithm and protocol for a spanning tree to control the routing of data packets across network segments, as set forth in section 4 of ANSI/IEEE standard 802.1D for Media Access Control (MAC) bridging. The IEEE standard eliminated the problem of multiple copies of the same data packet being forwarded to or over a particular network segment. However, the standard also required that each node in the network maintain information regarding the state of the spanning tree as well, which introduced the need for recovery procedures every time the state changed, and caused delay in the operation of the internetwork. A change in internetwork topology required recalculation of the network connectivity graph, as well as the relearning of addresses and forwarding tables at each of the bridges in the internetwork. This reconvergence takes time, during which data packets are not transmitted across the internetwork. What is needed is a different multicast data packet forwarding paradigm that does not rely on the spanning tree algorithm and protocol. Moreover, what is needed is a model for forwarding multicast data traffic that transcends IEEE local area networks to other networks such as satellite-, radio-, Signaling System 7 (SS7), cellular-, packet switched-, wide area-, asynchronous data cell-, and other types of networks.

BRIEF SUMMARY OF THE INVENTION

The present invention provides for a method and apparatus for forwarding multicast data packets in a meshed topology network. A packet forwarding device, such as a internetwork router, receives a multicast data packet, i.e., a data packet specifying a multicast destination address, at an ingress port of the packet forwarding device. The packet forwarding device determines if the multicast data packet has been previously received, and if so, discards the multicast data packet. Otherwise, the packet forwarding device determines the appropriate ports of the packet forwarding device out which the multicast data packet is to be forwarded according to a packet forwarding control protocol and forwards the multicast data packet out the appropriate ports of the packet forwarding device.

BRIEF SUMMARY OF THE SEVERAL VIEWS OF THE DRAWINGS

The present invention is illustrated by way of example and not limitation in the following figures, in which.

DETAILED DESCRIPTION OF THE INVENTION

Described is a method and apparatus for multicasting data packets in a meshed topology network. In the following description, numerous specific details are set forth in order to provide a thorough understanding of the present invention. It will be apparent, however, to one of ordinary skill in the art that the present invention may be practiced without these specific details. In other instances, well-known architectures, steps, and techniques have not been shown to avoid unnecessarily obscuring the present invention. For example, specific details are not provided as to whether the method is implemented in a router or switch as a software routine, hardware circuit, firmware, or a combination thereof.

In alternative embodiments, the present invention may be applicable to implementations of the invention in integrated circuits or chip sets, wireless implementations, switching systems products and transmission systems products. For purposes of this application, the terms switching systems products shall be taken to mean private branch exchanges (PBXs), central office switching systems that interconnect subscribers, toll/tandem switching systems for interconnecting trunks between switching centers, and broadband core switches found at the center of a service provider's network that may be fed by broadband edge switches or access multiplexors, and associated signaling, and support systems and services. The term transmission systems products shall be taken to mean products used by service providers to provide interconnection between their subscribers and their networks such as loop systems, and which provide multiplexing, aggregation and transport between a service provider's switching systems across the wide area, and associated signaling and support systems and services.

Embodiments of the invention may be represented as a software product stored on a machine-readable medium (also referred to as a computer-readable medium, a processor-readable medium, or a computer usable medium having a computer readable program code embodied therein). The machine-readable medium may be any type of magnetic, optical, or electrical storage medium including a diskette, CD-ROM, memory device (volatile or non-volatile), or similar storage mechanism. The machine-readable medium may contain various sets of instructions, code sequences, configuration information, or other data Those of ordinary skill in the art will appreciate that other instructions and operations necessary to implement the described invention may also be stored on the machine-readable medium.

The present invention is concerned with minimizing the duplication of multicast data packets. The term multicast data packet, as used herein, is meant to include all types of multicast traffic, including voice, video, data, etc., whether transmitted in packet, frame, datagram, segment, cell or other fixed- or variable-length data packaging formats. The goal of the present invention is to remove the need for nodes in the internetwork to communicate and store state about the network segments in the internetwork and is applicable at any layer of the internetwork architecture at which multicast traffic is possible, e.g., the physical, data link, network, transport, application, or other various defined and well known protocol layers associated with such networks as IEEE traditional, fast and gigabit local area networks, token ring, FDDI, ATM, Frame Relay, X.25, satellite, radio, Signaling System 7 (SS7), cellular, packet switched, wide area, synchronous data cell, asynchronous data cell, and other types of networks.

Essentially, according to an embodiment of the present invention, forwarding of multicast traffic is performed at the local level. That is, a local decision is made at a data packet forwarding device, such as a bridge, switch, network layer switch, or router, whether to forward the multicast traffic, and if so, out which ports, on a per packet basis. A routing control protocol, such a the Linear Flow Routing Protocol (LFRP), or the Internet Group Management Protocol (IGMP), is used to determine the ports that are to forward the multicast traffic. Upon receiving a multicast data packet at a particular port, the data packet forwarding device compares the data packet to previously received multicast data packets. More correctly, the multicast data packet is imiquely identified, and a database or data structure is consulted for an indication that such uniquely identified multicast data packet as previously received at the data packet forwarding device. If the multicast data packet was previously received on this or another particular port, the multicast data packet is dropped or discarded, otherwise, it is transmitted to the appropriate ports, suppressing the receiving, or ingress port, according to the routing control protocol such as LFRP or IGMP.

As will be seen, an embodiment of the present invention identifies each multicast data packet uniquely. The method chosen in the embodiment is to provide a 64 bit unique identifier for the packet, comprising a node identifier, e.g., a 32 bit Internet Protocol (IP) address, and a local sequence number, also 32 bits. Furthermore, the storing and forwarding decision based on the unique identifier can either be centrally managed, e.g., by a centralized Content Addressable Memory (CAM) and associated circuitry/firmware, or the decision may be distributed at the receive or transmit circuitry of each port of the data forwarding device.

The present invention is robust in the sense that if a path exists between a source node and a destination node that is a member of the multicast group, the path is made available for transmission of multicast traffic. Duplication of multicast data packets is, therefore, highly possible, especially in a meshed topology internetwork, i.e., when multiple paths exist between points or segments in the internetwork. For example, a switch with N nodes may receive up to N copies of the same multicast data packet. However, the effect of this is slight if the N frames are immediately eliminated at the switch with at most one of the data packets being forwarded out the appropriate ports.

As for data packet forwarding device architectures, different architectures necessitate different implementations of an embodiment of the present invention. For example, a matrix switch, which often is more constrained with respect to multicast data packet forwarding, would likely implement the store and forward data structures and mechanisms of the present invention at the ingress, or receiving port of the switch, which other switching systems may utilize a central CAM architecture.

Figure 1:
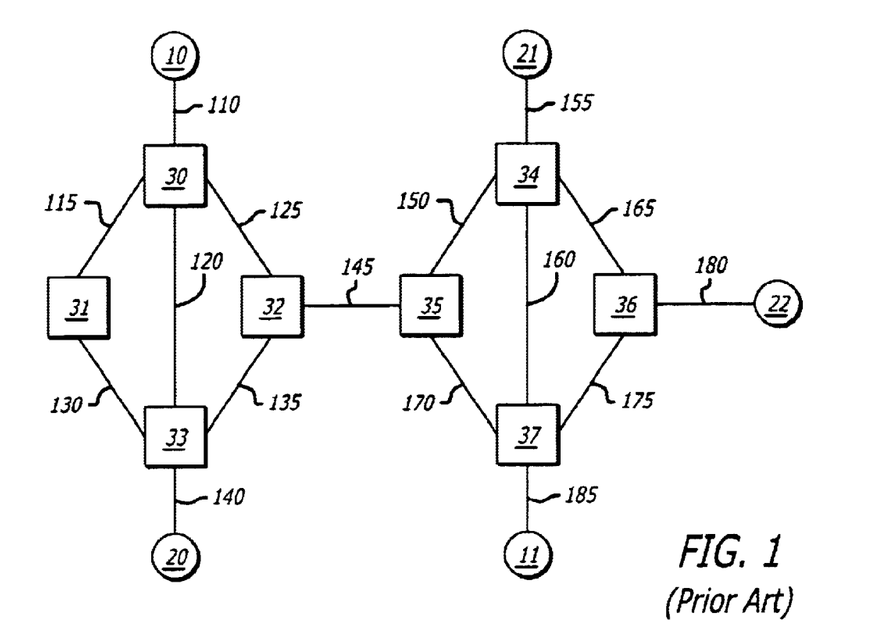
FIG. 1 is a block diagram of an internetwork to which an embodiment of the present invention may be applied.
Figure 2:
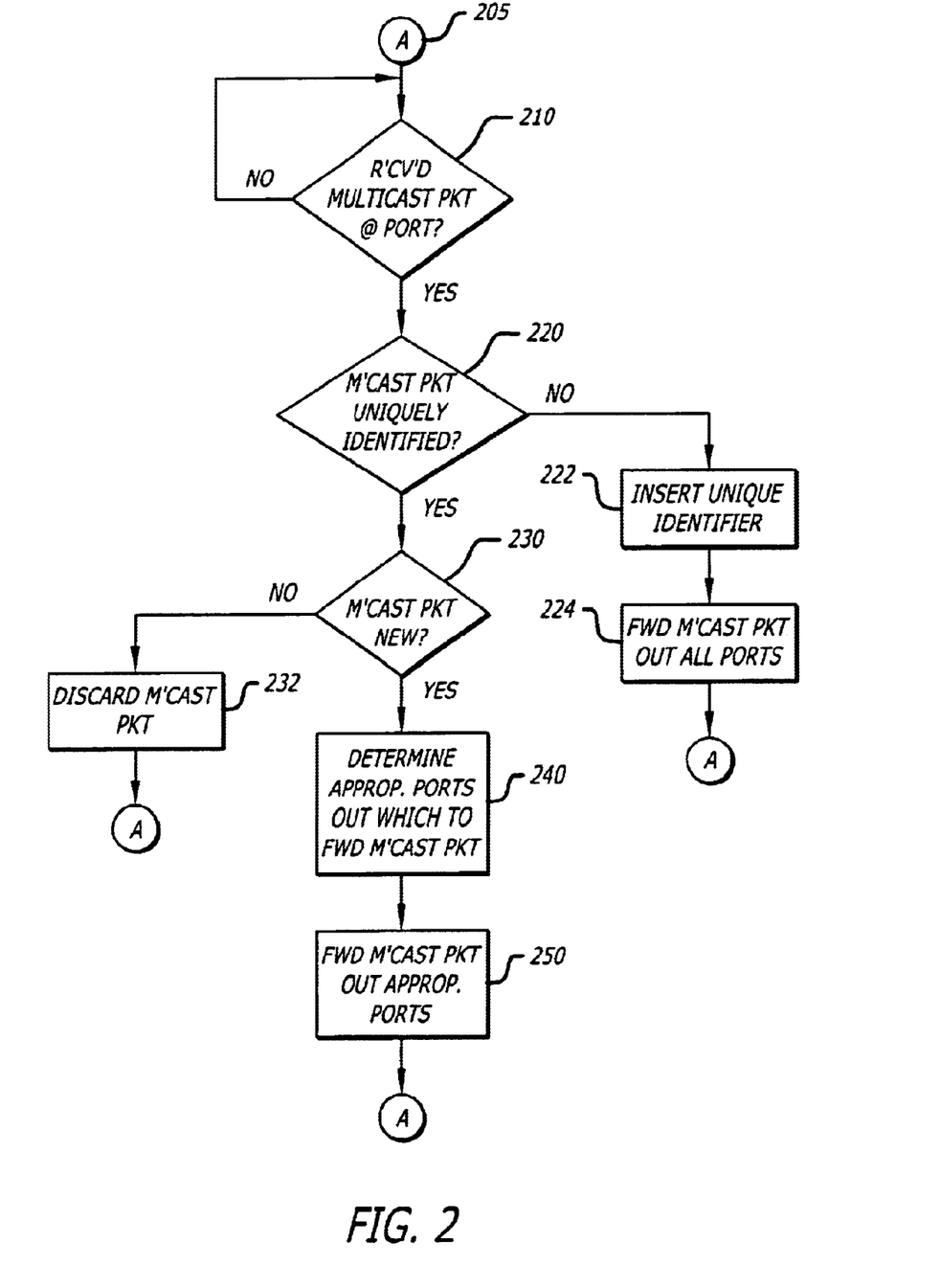
FIG. 2 is a flow chart of an embodiment of the present invention.

Although an embodiment of the present invention does not provide for sequenced delivery of multicast data packets, in most network environments with little queuing delays, the multicast data packets are generally delivered in sequence. Further, an embodiment of the present invention is completely dynamic and assures that the routes chosen between the source and destination nodes are the optimum routes for the multicast data packet, by relying on IGMP or the like to provide the basic group membership information necessary to prune the multicast tree accordingly. With reference to FIGS. 1 and 2, an embodiment of the present invention is now described. FIG. 1 illustrates a simple internetwork comprising end stations, node, or hosts 10–22, connected together via switches 30–37 and point to point communication links 110–185. Although only switches 30, 33, 34, 36 and 37 have attached thereto respective nodes 10, 20, 21, 22 and 11 via respective communication links 110, 140, 155, 180 and 185, it is understood that the all the switches are capable of providing a point of connection to the internetwork for a number of nodes via either a shared or point to point communication links. In FIG. 1, multiple (i.e., redundant) communication paths exist between nodes, and the switches connecting the nodes. Although not shown, it is understood that the transmission speed and other operational characteristics of the communication links differ from link to link. For example, some links may be 10, 100 or 1000megabits per second local area network links, while other links may operate according to a wide area network or telecommunications protocol.

Node 10 is connected to node 20 via three alternative paths: 1) link 110, switch 30, link 115, switch 31, link 130, switch 33 and link 140, or 2) link 110, switch 30, link 120, switch 33, link 140, or 3) link 110, switch 30, link 125, switch 32, link 135, switch 33, and link 140. Similarly, there are 6 alternative communication paths between node 10 and node 11. Hence, without any restraints or controls in place, it is conceivable that up to 6 copies or duplicates of a multicast data packet sent from node 10 could be received at node 11. However, according to one embodiment of the present invention, only one copy of a multicast data packet sent from node 10 to a multicast group of which node 11 is a member is forwarded by switch 32. Depending on the switching capabilities and link speeds along each alternative path, the duplicate packets are likely received at varying times at switch 32. The switch simply forwards the first copy of the multicast data packet that it receives, and discards all but the first copy of the multicast data packet. Likewise, although there are three communication paths between switch 35 and switch 37, and hence, possibly three copies of the multicast data packet destined for node 11 ultimately received at switch 37, switch 37 forwards the first copy of the multicast data packet it receives to node 11.

Figure 3:
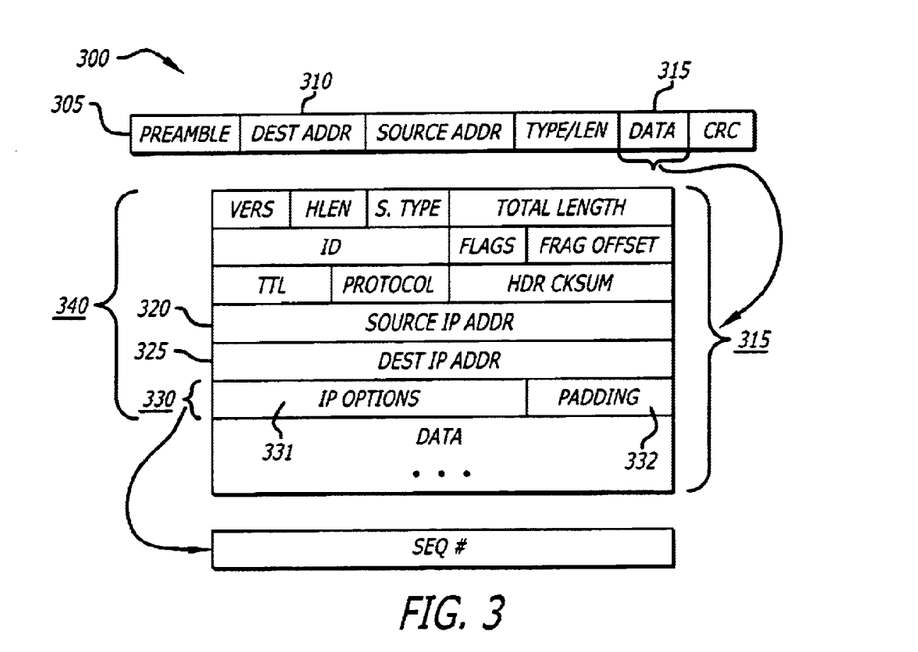
FIG. 3 is a block diagram of a packet format as may be utilized by an embodiment of the present invention.

With reference to FIGS. 2 and 3, as an example, presume node 10 sends a multicast data packet, or simply, packet, to group of nodes. The multicast data packet generally includes a special destination address that is recognized by the nodes that are members of the multicast group. For example, FIG. 3 illustrates the format of an Ethernet or IEEE 802.3 Media Access Control (MAC) frame 300. The special destination address is maintained in MAC destination address field 310. If, as in the example, the MAC frame encapsulates an IP datagram 315, there may well be a special, i.e., multicast address in the IP destination address field 325 of IP header 340, which is mapped to the hardware multicast address stored in MAC destination address field 310.

Further presume node 11 is a member of the multicast group identified by the special multicast destination address. The process begins at 205 with the transmission of the multicast data packet by node 10 over communications link 110 to switch 30. At 210, switch 30 receives the multicast data packet at an ingress or receiving port of the switch. The switch determines, at 220, whether the packet is uniquely identified. With reference to FIG. 3, an example is provided in which an embodiment of the present invention uniquely identifies the multicast packet by the presence of a 32 bit sequence number inserted in the 24 bit options field 331 and 8 bit padding field 332 (collectively, field 330) of an Internet Protocol (IP) datagram IP header. If at 220, a sequence number is not present, the packet is not uniquely identified, and an identifier is then inserted in field 330 at step 222. In another embodiment of the invention, the unique identifier is the combination of the contents of the IP source address field 320 and the 32 bit sequence number inserted in the options/padding fields 330. Alternatively, the unique identifier is any portion of a multicast data packet, whether part of the contents of one or more fields of a standard or nonstandard packet header, so long as each packet may be uniquely identified.

If switch 30 receives a multicast data packet that does not have a unique identifier present, however that unique identifier is defined, it implies that the packet has not been received at another switch in the network participating in the method and apparatus of the present invention. That is, when a source node transmits a multicast data packet to a neighbor switch or router, initially the unique identifier is not present. It is the responsibility of the neighbor switch, as the first switch to receive the multicast data packet, to insert the unique identifier, either by adding one or more new fields in the packet, or replacing the contents of existing fields in the packet, as the case may be, with the unique identifier. The neighbor switch then forwards at 224 the now uniquely identified multicast data packet out all ports of the neighbor switch, with the exception of the port at which the multicast data packet was received.

In the network illustrated in FIG. 1, duplicate copies of the uniquely identified multicast data packet are forwarded by switch 30 out ports connected to communication links 115, 120 and 125. Thus, the next hop switches 31, 32 and 33 each receive the copied packet at 210, and determine at 220 whether the packet is uniquely identified. Given that the neighbor router inserted the unique identifier at 224, the packet is uniquely identified. Thus, the switches determine the packet has been received before at 230, and if so, discard the packet at 232. Given that there is not alternative paths from switch 30 to either of switches 31 and 32, neither switch has seen the packet before, and so the process moves on to 240. Switch 33, on the other hand, may be reached from switch 30 via 3alternative paths, as described above. Thus, it is possible, given the switching capabilities and configuration of switches 31 and 32, as well as the link speed and operational condition (e.g., traffic congestion, etc.) being experienced on links 115, 120, 125 and 130, that switch 33 has already received a duplicate copy of the packet via links 130 or 135 before it receives the copy of the packet via link 120, in which case the packet received via link 120 is discarded at 232.

At each of the next hop switches, if the multicast packet is new, i.e., has not been received before, the determination of which is discussed below, each of the switches determines out which ports to forward the uniquely identified data packet. According to one embodiment of the present invention, the switches exchange and maintain group membership information in accordance with the well known Internet Society's Internet Group Management Protocol (IGMP) set forth in Deering, S., "Host Extensions for IP Multicasting", Request For Comments (RFC) 1112, August, 1989.

Using IGMP, nodes inform their neighbor switch(es) that they participate or are members in a multicast group. The neighbor switches, in turn, contact next hop switches in the internetwork, passing on the group membership information, much in the same manner as switches exchange routing information. A switch informs its next hop switches, i.e., switches directly connected to a point to point or shared communication link in common with the switch, that one or more nodes is locally attached to the switch via a shared or one or more point to point communication links. In the network illustrated in FIG. 1, node 11, for example, informs neighbor switch 37 that it is a member of a particular (or multiple) multicast group(s), e.g., the multicast group to which the packet sent by node 10 is destined. Switch 37 in turn, transmits IGMP messages to next hop switches 34–36, which in turn, forward the IGMP message to their respective next hop switches, and so on, until all switches in the internetwork collectively maintain a distributed data structure that identifies out which port of a particular switch a multicast data packet should be sent to reach all members of the multicast group.

Switches 31 and 33, therefore, forward their respective first received copies of the multicast packet out the appropriate ports that lead to switch 32, via links 130 and 135 respectively. Switch 32 forwards its first received copy of the multicast packet over link 145 to switch 35. The multicast packet continues to be forwarded in this manner until a copy of the packet is first received at switch 37. Switch 37, checking its forwarding tables, determines that node 11 is a member of the multicast group and is attached to local communications link 185. Switch 37, therefore, strips the unique identifier, and forwards the multicast packet out the port attached to the local communications link 185, where it is received by node 11.

In an alternative embodiment, other routing control protocols, e.g., the LFRP protocol referenced above, or the Open Shortest First Path (OSPF) protocol, may be used to direct and limit the number of copies of the multicast data packet sourced by node 10, depending on the degree to which the network is optimized to provide redundancy and fault tolerance versus congestion control and transmission efficiency.

Optimized Hash Ring

Although the look up function for the multicast packet forwarding process may be performed in software and is likely implemented for supporting low bandwidth applications, it may also be implemented efficiently in hardware. The function, however, implemented, should retain information regarding whether the multicast data packet in question has already been received at the data packet forwarding device, therefore, no associated data is needed. However, due to the volume of traffic involved, the table management should be simplified—ordinary hash operations which often take much time to complete, such as insert, delete, should be optimized, if a hashing function is used.

A ring hash performs the lookup function in a very efficient manner. The hash ring is a circular buffer of M-bit hash key entries. The ring buffer contains P buffers and a pointer that points to the present entry of the circular buffer. A corresponding hash table comprises a matrix with P columns of bits and K rows, wherein K depends on the hash. The number of rows should be chosen relative to the number of hashing entries. For example, if the number of stored entries, P, in the ring buffer is 1024, then the number of rows, K, in the matrix should be proportional to the square root of P, or in the range of 32–64 rows.

The hash matrix contains a '1' bit for each match in the ring buffer of hash keys. To search the hash, one simply calculates the key, identifies the one bits in the hash and compares the stored hash key value with the proposed hash key. To insert a new key, the proposed key is written to the present position in the ring (as defined by the counter) and increment the pointer to point to the next ring position. The resulting column in the hash matrix is cleared and a '1' bit is set in a the appropriate position (k,n) to indicate a potential future hash match. Deletions are handled automatically as the counter progresses around the ring buffer.

In accordance with an embodiment of the present invention, the look up function receives a multicast data packet, reads the IP address and sequence number fields, and performs a hash on the values read (64 bit input). In one embodiment, the result of the hash function is $\log_2 K$ bits long. The function then searches a hash table for "1" bits in the $k^{th}$ row, where $0 \leq k \leq K-1$. The "1" bits correspond to which descriptors in the ring buffer to locate. For example, if the bit in the first column of the $k^{th}$ row is set, then the function checks the first buffer pointed to by the ring pointer, whereas if the bit in the fourth column of the $K^{th}$ row is set, the function checks the fourth buffer pointed to by the ring pointer. The function then compares the corresponding k entries in the ring buffer with the received IP address and sequence fields to determine whether the multicast packet has been received before, and if not, inserts the IP address and sequence number fields in the ring buffer, updates the hash table, and the process floods the multicast packet out all ports of the data packet forwarding device other than the port at which the multicast packet was received. Otherwise, (a match has occurred, and) the multicast data packet is discarded.

What is claimed is:

1. A method for forwarding multicast data packets, comprising:
   a) receiving a multicast data packet at a port of a packet forwarding device;
   b) examining a unique identifier inserted in a packet header of the multicast data packet to determine if the multicast data packet has been previously received at the packet forwarding device, wherein the unique identifier is in an options field of a Transport Control Protocol (TCP) header in the multicast data packet;
   c) discarding the multicast data packet if the multicast data packet has been previously received, otherwise:
      i) determining the appropriate ports of the packet forwarding device out which the multicast data packet is to be forwarded according to a packet forwarding control protocol;
      ii) forwarding the multicast data packet out the appropriate ports of the packet forwarding device.

2. The method of claim 1, wherein determining the appropriate ports of the packet forwarding device out which the multicast data packet is to be forwarded according to a packet forwarding control protocol comprises determining the appropriate ports of the packet forwarding device out which the multicast data packet is to be forwarded according to a multicast packet forwarding control protocol.

3. The method of claim 1, wherein determining the appropriate ports of the packet forwarding device out which the multicast data packet is to be forwarded according to a multicast packet forwarding control protocol comprises determining the appropriate ports of the packet forwarding device out which the multicast data packet is to be forwarded according to an Internet Group Management Protocol (IGMP).

4. A method for multicasting data packets in an meshed topology network, comprising:
   a) maintaining multicast group membership information among a plurality of packet forwarding devices in the meshed topology network including propagating and storing the group membership information among the packet forwarding devices in the meshed topology network using Internet Group Management Protocol (IGMP) messages;
   b) transmitting a multicast data packet from a source node in the meshed topology network for delivery to a plurality of destination nodes that are members of a multicast group;
   c) receiving the multicast data packet at a port of a neighbor packet forwarding device;
   d) adding an identification number to the multicast data packet to uniquely identify the multicast data packet including inserting an identification number in an options field of an Internet Protocol (IP) header in the multicast data packet;
   e) identifying each port of the neighbor packet forwarding device other than the receiving port out which at least one of the plurality of destination nodes is reachable, based on the multicast group membership information maintained at the neighbor packet forwarding device;
   f) forwarding the multicast data packet out each identified port;
   g) receiving the multicast data packet at a port of a next hop packet forwarding device;
   h) checking the identification number added to the multicast data packet; and
   i) discarding the multicast data packet if the next hop packet forwarding device recognizes the identification number, otherwise
      1) identifying each port of the next hop packet forwarding device other than the receiving port out which at least one of the plurality of destination nodes is reachable, based on the multicast group membership information maintained at the next hop packet forwarding device;
      2) forwarding the multicast data packet out each identified port.

5. A method for multicasting data packets in an meshed topology network, comprising:
   a) maintaining multicast group membership information among a plurality of packet forwarding devices in the meshed topology network including propagating and storing the group membership information among the packet forwarding devices in the meshed topology network using Internet Group Management Protocol (IGMP) messages.
   b) transmitting a multicast data packet from a source node in the meshed topology network for delivery to a plurality of destination nodes that are member of a multicast group;

c) receiving the multicast data packet at a port of a neighbor packet forwarding device;

d) adding an identification number to the multicast data packet to uniquely the multicast data packet including. in the multicast data packet;

e) identifying each port of the neighbor packet forwarding device other than the receiving port out which at least one of the plurality of destination nodes is reachable, based on the multicast group membership information maintained at the neighbor packet forwarding device;

f) forwarding the multicast data packet out each identified port;

g) receiving the multicast data packet at a port of a next hop packet forwarding device;

h) checking the identification number added to the multicast data packet; and i) discarding the multicast data packet if the hop packet forwarding device recognizes the identification number, otherwise
   1) identifying each port of the next hop packet forwarding devise other than the receiving port out which at least one of the plurality of destination nodes is reachable, based on the multicast group membership information maintained at the next hop packet forwarding device;
   2) forwarding the multicast data packet out each identified port.

6. A method for multicasting data packets in an meshed topology network, comprising:

a) maintaining multicast group membership information among a plurality of packet forwarding devices in the meshed topology network including propagating and storing the group membership information among the packet forwarding devise in the meshed topology network using Internet Group Management Protocol (IGMP) messages;

b) transmitting a multicast data packet form a source node in the meshed topology network for delivery to a plurality of destination nodes that are members of a multicast group;

c) receiving the multicast data packet at a port of a neighbor packet forwarding device;

d) adding an identification number to the multicast data packet to uniquely identify the multicast data packet including inserting an identification number in an option field of a Transport Control Protocol (TCP) header in the multicast data packet;

e) identifying each port of the neighbor packet forwarding device other than the receiving port out which at least one of the plurality of destination nodes is reachable, based on the multicast group membership information maintained at the neighbor packet forwarding device;

f) forwarding the multicast data packet out each identified port;

g) receiving the multicast data packet at a port of a next hop packet forwarding device;

h) checking the identification number added to the multicast data packet; and i) discarding the multicast data packet if the next hop packet forwarding device recognizes the identification number, otherwise
   1) identifying each port of the next hop packet forwarding device other than the receiving port out which at least one of the plurality of destination nodes is reachable, based on the multicast group membership information maintained at the next hop packet forwarding device;
   2) forwarding the multicast data packet out each identified port.

7. An article of manufacture comprising a computer readable medium having computer readable program code means embodied therein for forwarding multicast data packets, the computer readable program code means in said article of manufacture, comprising:

computer readable program code means for receiving a multicast data packet at a port of a packet forwarding device;

computer readable program code means for examining a unique identifier inserted in a packet header of the multicast data packet to determine if the multicast data packet has been previously received at the packet forwarding device, wherein the unique identifier is in an options field of a Transport Control Protocol (TCP) header in the multicast data packet;

computer readable program code means for discarding the multicast data packet if the multicast data packet has been previously received, otherwise, determining the appropriate ports of the packet forwarding device out which the multicast data packet is to be forwarded according to a packet forwarding control protocol and forwarding the multicast data packet out the appropriate ports of the packet forwarding device.

8. The article of manufacture of claim 7, wherein the computer readable program code means for determining the appropriate ports of the packet forwarding device out which the multicast data packet is to be forwarded according to a packet forwarding control protocol comprises computer readable program code means for determining the appropriate ports of the packet forwarding device out which the multicast data packet is to be forwarded according to a multicast packet forwarding control protocol.

9. The article of manufacture of claim 7, wherein the computer readable program code means for determining the appropriate ports of the packet forwarding device out which the multicast data packet is to be forwarded according to a multicast packet forwarding control protocol comprises computer readable program code means for determining the appropriate ports of the packet forwarding device out which the multicast data packet is to be forwarded according to an Internet Group Management Protocol (IGMP).

10. The method of claim 1, further comprising:
determining if the unique identifier has been inserted in the packet header of the multicast data packet; and
inserting the unique identifier in the packet header of the multicast data packet if it is determined that the unique identifier has not been inserted in the packet header of the multicast data packet.

11. The method of claim 1, wherein the unique identifier is in an options field of an Internet Protocol (IP) header in the multicast data packet.

12. The article of manufacture of claim 7, wherein the computer readable program code means for determining the appropriate ports of the packet forwarding device out which the multicast data packet is to be forwarded according to a packet forwarding control protocol further comprises:

computer readable program code means for determining if the unique identifier has been inserted in the packet header of the multicast data packet; and
computer readable program code means for inserting the unique identifier in the packet header of the multicast data packet if it is determined that the unique identifier has not been inserted in the packet header of the multicast data packet.

13. The method of claim 7, wherein the unique identifier is in an option field of an Internet Protocol (IP) header in the multicast data packet.

14. A method for forwarding multicast data packets, comprising:
   a) receiving a multicast data packet at a port of a packet forwarding device;
   b) examining a unique identifier inserted in a packet header of the multicast data packet to determine if the multicast data packet has been previously received at the packet forwarding device, wherein the unique identifier is in an options field of a Transport Control Protocol (TCP) header in the multicast data packet;
   c) discarding the multicast data packet if the multicast data packet has been previously received, otherwise:
      i) determining the appropriate ports of the packet forwarding device out which the multicast data packet is to be forwarded according to an Internet Group Management Protocol (IGMP);
      ii) forwarding the multicast data packet out the appropriate ports of the packet forwarding device.

15. The method of claim 14, wherein determining the appropriate ports of the packet forwarding device out which the multicast data packet is to be forwarded according to a packet forwarding control protocol comprises determining the appropriate ports of the packet forwarding device out which the multicast data packet is to be forwarded according to a multicast packet forwarding control protocol.

16. The method of claim 14, further comprising:
   determining if the unique identifier has been inserted in the packet header of the multicast data packet; and
   inserting the unique identifier in the packet header of the multicast data packet if it is determined that the unique identifier has not been inserted in the packet header of the multicast data packet.

17. The method of claim 14, wherein the unique identifier is in an options field of an Internet. Protocol (IP) header in the multicast data packet.

18. The method of claim 14, wherein the unique identifier precedes an Internet Protocol (IP) header in the multicast data packet.

19. A method for forwarding multicast data packets, comprising:
   a) receiving a multicast data packet at a port of a packet forwarding device;
   b) determining if a unique identifier has been inserted in an options field of an Internet Protocol (IP) header of the multicast data packet;
   c) inserting the unique identifier in the packet header of the multicast data packet if it is determined that the unique identifier has not been inserted in the packet header of the multicast data packet;
   d) examining the unique identifier inserted in the packet header of the multicast data packet to determine if the multicast data packet has been previously received at the packet forwarding device;
   e) discarding the multicast data packet if the multicast data packet has been previously received, otherwise:
      i) determining the appropriate ports of the packet forwarding device out which the multicast data packet is to be forwarded according to a packet forwarding control protocol;
      ii) forwarding the multicast data packet out the appropriate ports of the packet forwarding device.

20. The method of claim 19, wherein determining the appropriate ports of tho packet forwarding device out which the multicast data packet is to be forwarded according to a packet forwarding control protocol comprises determining the appropriate ports of the packet forwarding device out which the multicast data packet is to be forwarded according to a multicast packet forwarding control protocol.

21. The method of claim 19, wherein determining the appropriate ports of the packet forwarding device out which the multicast data packet is to be forwarded according to a multicast packet forwarding control protocol comprises determining the appropriate ports of the packet forwarding device out which the multicast data packet is to be forwarded according to an Internet Group Management Protocol (IGMP).

22. A method for forwarding multicast data packets, comprising:
   a) receiving a multicast data packet at a port of a packet forwarding device;
   b) determining if a unique identifier has been inserted in a packet header of the multicast data packet preceding an Internet Protocol (IP) header in the multicast data packet;
   c) inserting the unique identifier in the packet header of the multicast data packet if it is determined that the unique identifier has not been inserted in the packet header of the multicast data packet;
   d) examining the unique identifier inserted in the packet header of the multicast data packet to determine if the multicast data packet has been previously received at the packet forwarding device;
   e) discarding the multicast data packet if the multicast data packet has been previously received, otherwise:
      i) determining the appropriate ports of the packet forwarding device out which the multicast data packet is to be forwarded according to a packet forwarding control protocol;
      ii) forwarding the multicast data packet out the appropriate ports of the packet forwarding device.

23. A method for forwarding multicast data packets, comprising:
   a) receiving a multicast data packet at a port of a packet forwarding device;
   b) determining if a unique identifier has been inserted in an options field of a Transport Control Protocol (TCP) header in the multicast data packet;
   c) inserting the unique identifier in the packet header of the multicast data packet if it is determined that the unique identifier has not been inserted in the packet header of the multicast data packet;
   d) examining the unique identifier inserted in the packet header of the multicast data packet to determine if the multicast data packet has been previously received at the packet forwarding device;
   e) discarding the multicast data packet if the multicast data packet has been previously received otherwise:
      i) determining the appropriate ports of the packet forwarding device out which the multicast data packet is to be forwarded according to a packet forwarding control protocol;
      ii) forwarding the multicast data packet out the appropriate port of the packet forwarding device.

24. A method for forwarding multicast data packets, comprising:

a) receiving a multicast data packet at a port of a packet forwarding device;
b) examining a unique identifier inserted in an options field of one of an Internet Protocol (IP) header and a Transport Control Protocol (TCP) header of the multicast data packet to determine if the multicast data packet has been previously received at the packet forwarding device;
c) discarding the multicast data packet if the multicast data packet has been previously received, otherwise:
  i) determining the appropriate ports of the packet forwarding device out which the multicast data packet is to be forwarded according to a packet forwarding control protocol;
  ii) forwarding the multicast data packet out the appropriate ports of the packet forwarding device.

25. The method of claim 24, wherein determining the appropriate ports of the packet forwarding device out which the multicast data packet is to be forwarded according to a packet forwarding control protocol comprises d e the appropriate ports of the packet forwarding device out which the multicast data packet is to be forwarded according to a multicast packet forwarding control protocol.

26. The method of claim 24, wherein determining the appropriate ports of the packet forwarding device out which the multicast data packet is to be forwarded according to a multicast packet forwarding control protocol comprises determining the appropriate ports of the packet forwarding device out which the multicast data packet is to be forwarded according to an Internet Group Management Protocol (IGMP).

27. The method of claim 24, further comprising:
determining if the unique identifier has been inserted in the packet header of the multicast data packet; and
inserting the unique identifier in the packet header of the multicast data packet if it is determined that the unique identifier has not been inserted in the packet header of the multicast data packet.

28. The method of claim 24, wherein the unique identifier precedes an Internet Protocol (IP) header in the multicast data packet.

29. An article of manufacture comprising a computer readable medium having computer readable program code means embodied therein for forwarding multicast data packets, the computer readable program code means in said article of manufacture, comprising:
computer readable program code means for receiving a multicast data packet at a port of a packet forwarding device;
computer readable program code means for examining a unique identifier inserted in a packet header of the multicast data packet to determine if the multicast data packet has been previously received at the packet forwarding device, wherein the unique identifier is in an options field of a Transport Control Protocol (TCP) header in the multicast data packet;
computer readable program code means for discarding the multicast data packet if the multicast data packet has been previously received, otherwise, determining the appropriate ports of the packet forwarding device out which the multicast data packet is to be forwarded according to an Internet Group Management Protocol (IGMP) and forwarding the multicast data packet out the appropriate ports of the packet forwarding device.

30. The article of manufacture of claim 29, wherein the computer readable program code means for determining the appropriate ports of the packet forwarding device out which the multicast data packet is to be forwarded according to a packet forwarding control protocol comprises computer readable program code means for determining the appropriate ports of the packet forwarding device out which the multicast data packet is to be forwarded according to a multicast packet forwarding control protocol.

31. The article of manufacture of claim 29, wherein the computer readable program code means for determining the appropriate ports of the packet forwarding device out which the multicast data packet is to be forwarded according to a packet forwarding control protocol further comprises:
computer readable program code means for determining if the unique identifier has been inserted in the packet header of the multicast data packet; and
computer readable program code means for inserting the unique identifier in the packet header of the multicast data packet if it is determined that the unique identifier has not been inserted in the packet header of the multicast data packet.

32. The method of claim 29, wherein the unique identifier is in an options field of an Internet Protocol (IP) header in the multicast data packet.

33. The method of claim 29, wherein the unique identifier precedes an Internet Protocol (IP) header in the multicast data packet.

34. An article of manufacture comprising a computer readable medium having computer readable program code means embodied therein for forwarding multicast data packets, the computer readable program code means in said article of manufacture, comprising:
computer readable program code means for receiving a multicast data packet at a port of a packet forwarding device;
computer readable program code means for determining if a unique identifier has been inserted in an options field of an Internet Protocol (IP) header of the multicast data packet;
computer readable program code means for inserting the unique identifier in the packet header of the multicast data packet if it is determined that the unique identifier has not been inserted in the packet header of the multicast data packet;
computer readable program code means for examining the unique identifier inserted in the packet header of the multicast data packet to determine if the multicast data packet has been previously received at the packet forwarding device;
computer readable program code means for discarding the multicast data packet if the multicast data packet has been previously received, otherwise, determining the appropriate ports of the packet forwarding device out which the multicast data packet is to be forwarded according to a packet forwarding control protocol and forwarding the multicast data packet out the appropriate ports of the packet forwarding device.

35. The article of manufacture of claim 34, wherein the computer readable program code means for determining the appropriate ports of the packet forwarding device out which the multicast data packet is to be forwarded according to a packet forwarding control protocol comprises computer readable program code means for determining the appropriate ports of the packet forwarding device out which the multicast data packet is to be forwarded according to a multicast packet forwarding control protocol.

36. The article of manufacture of claim 34, wherein the computer readable program code means for determining the appropriate ports of the packet forwarding device out which the multicast data packet is to be forwarded according to a multicast packet forwarding control protocol comprises computer readable program code means for determining the appropriate ports of the packet forwarding device out which the multicast data packet is to be forwarded according to an Internet Group Management Protocol (IGMP).

37. An article of manufacture comprising a computer readable medium having computer readable program code means embodied therein for forwarding multicast data packets, the computer readable program code means in said article of manufacture, comprising:

computer readable program code means for receiving a multicast data packet at a port of a packet forwarding device;

computer readable program code means for determining if a unique identifier has been inserted in a packet header of the multicast data packet preceding an Internet Protocol (IP) header in the multicast data packet;

computer readable program code means for inserting the unique identifier in the packet header of the multicast data packet if it is determined that the unique identifier has not been inserted in the packet header of the multicast data packet;

computer readable program code means for examining the unique identifier inserted in the packet header of the multicast data packet to determine if the multicast data packet has been previously received at the packet forwarding device;

computer readable program code means for discarding the multicast data packet if the multicast data packet has been previously received otherwise, determining the appropriate ports of the packet forwarding device out which the multicast data packet is to be forwarded according to a packet forwarding control protocol and forwarding the multicast data packet the appropriate ports of the packet forwarding device.

38. An article of manufacture comprising a computer readable medium having computer readable program code means embodied therein for forwarding multicast data packets, the computer readable program code means in said article of manufacture, comprising:

computer readable program code means for receiving a multicast data packet at a port of a packet forwarding device;

computer readable program code means for determining if a unique identifier has been inserted in an options field of a Transport Control Protocol (TCP) header in the multicast data packet;

computer readable program code means for inserting the unique identifier in the packet header of the multicast data packet if it is determined that the unique identifier has not been inserted in the packet header of the multicast data packet;

computer readable program code mean for examining the unique identifier inserted in the packet header of the multicast data packet to determine if the multicast data packet has been previously receive at the packet forwarding device;

computer readable program code means for discarding the multicast data packet if the multicast data packet has been previously received, otherwise, determining the appropriate ports of the packet forwarding device out which the multicast data packet is to be forwarded according to a packet forwarding control protocol and forwarding the multicast data packet out the appropriate ports of the packet forwarding device.

39. An article of manufacture comprising a computer readable medium having computer readable program code means embodied therein for forwarding multicast data packets, the computer readable program code means in said article of manufacture, comprising:

computer readable program code means for receiving a multicast data packet at a port of a packet forwarding device;

computer readable program code means for examining a unique identifier inserted in an options field of one of an Internet Protocol (IP) header and a Transport Control Protocol (TCP) header of the multicast data packet to determine if the multicast data packet has been previously received at the packet forwarding device;

computer readable program code means for discarding the multicast data packet if the multicast data packet has been previously received, otherwise, determining the appropriate ports of the packet forwarding device out which the multicast data packet is to be forwarded according to a packet forwarding control protocol and forwarding the multicast data packet out the appropriate ports of the packet forwarding device.

40. The article of manufacture of claim 39, wherein the computer readable program code means for determining the appropriate ports of the packet forwarding device out which the multicast data packet is to be forwarded according to a packet forwarding control protocol comprises computer readable program code mean for determining the appropriate ports of the packet forwarding device out which the multicast data packet is to be forwarded according to a multicast packet forwarding control protocol.

41. The article of manufacture of claim 39, wherein the computer readable program code means for determining the appropriate ports of the packet forwarding device out which the multicast data packet is to be forwarded according to a multicast packet forwarding control protocol comprises computer readable program code means for determining the appropriate ports of the packet forwarding device out which the multicast data packet is to be forwarded according to an Internet Group Management Protocol (IGMP).

42. The article of manufacture of claim 39, where in the computer readable program code means for determining the appropriate ports of the packet forwarding device out which the multicast data packet is to be forwarded according to a packet forwarding control protocol further comprises:

computer readable program code means for determining if the unique identifier has been inserted in the packet header of the multicast data packet; and computer readable program code means for inserting the unique identifier in the packet headers of the multicast data packet if it is determined that the unique identifier has not been inserted in the packet header of the multicast data packet.

43. The method of claim 39, wherein the unique identifier precedes an Internet Protocol (IP) header in the multicast data packet.

44. The method of claim 1, wherein the unique identifier precedes an Internet Protocol (IP) header in the multicast data packet.

45. The method of claim 7, wherein the unique identifier precedes an Internet Protocol (IP) header in the multicast data packet.

46. The method of claim 22, wherein determining the appropriate ports of the packet forwarding device out which the multicast data packet is to be forwarded according to a packet forwarding control protocol comprises determining the appropriate ports of the packet forwarding device out which the multicast data packet is to be forwarded according to a multicast packet forwarding control protocol.

47. The method of claim 22, wherein determining the appropriate ports of the packet forwarding device out which the multicast data packet is to be forwarded according to a multicast packet forwarding control protocol comprises determining the appropriate ports of the packet forwarding device out which the multicast data packet is to be forwarded according to an Internet Group Management Protocol (IGMP).

48. The method of claim 23, wherein determining the appropriate ports of the packet forwarding device out which the multicast data packet is to be forwarded according to a packet forwarding control protocol comprises determining the appropriate ports of the packet forwarding device out which the multicast data packet is to be forwarded according to a multicast packet forwarding control protocol.

49. The method of claim 23, wherein determining the appropriate ports of the packet forwarding device out which the multicast data packet is to be forwarded according to a multicast packet forwarding control protocol comprises determining the appropriate ports of the packet forwarding device out which the multicast data packet is to be forwarded according to an Internet Group Management Protocol (IGMP).

50. The article of manufacture of claim 37, wherein the computer readable program code means for determining the appropriate ports of the packet forwarding device out which the multicast data packet is to be forwarded according to a packet forwarding control protocol comprises computer readable program code means for determining the appropriate ports of the packet forwarding device out which the multicast data packet is to be forwarded according to a multicast packet forwarding control protocol.

51. The article of manufacture of claim 37, wherein the computer readable program code means for determining the appropriate ports of the packet forwarding device out which the multicast data packet is to be forwarded according to a multicast packet forwarding control protocol comprises computer readable program code means for determining the appropriate ports of the packet forwarding device out which the multicast data packet is to be forwarded according to an Internet Group Management Protocol (IGMP).

52. The article of manufacture of claim 38, wherein the computer readable program code means for determining the appropriate ports of the packet forwarding device out which the multicast data packet is to be forwarded according to a packet forwarding control protocol comprises computer readable program code means for determining the appropriate ports of the packet forwarding device out which the multicast data packet is to be forwarded according to a multicast packet forwarding control protocol.

53. The article of manufacture of claim 38, wherein the computer readable program code means for determining the appropriate ports of the packet forwarding device out which the multicast data packet is to be forwarded according to a multicast packet forwarding control protocol comprises computer readable program code means for determining the appropriate ports of the packet forwarding device out which the multicast data packet is to be forwarded according to an Internet Group Management Protocol (IGMP).

* * * * *